United States Patent [19]

Sands

[11] 3,846,361

[45] Nov. 5, 1974

[54] PHONOGRAPH RECORD COMPOSITION AND PROCESS
[76] Inventor: A. John Sands, P.O. Box 167, Bayside, N.Y. 11361
[22] Filed: June 14, 1972
[21] Appl. No.: 262,644

[52] U.S. Cl........ 260/28.5 D, 260/33.6 UA, 106/37
[51] Int. Cl...... C08f 45/52, C08f 45/28, C09k 3/00
[58] Field of Search.............. 260/28.5 D, 33.6 UA; 106/37

[56] References Cited
UNITED STATES PATENTS
| | | | |
|---|---|---|---|
| 1,932,889 | 10/1933 | Groff | 260/28.5 D |
| 2,028,126 | 1/1963 | Warren | 260/28.5 D |
| 2,217,170 | 10/1940 | Hunter | 260/28.5 D |
| 2,619,440 | 11/1952 | Lord | 106/37 |

OTHER PUBLICATIONS
PVC Technology, W. S. Penn, 1962, pages 48, 260, 346 and 347.

Primary Examiner—Morris Liebman
Assistant Examiner—S. L. Fox
Attorney, Agent, or Firm—Fleit, Gipple & Jacobson

[57] ABSTRACT

A phonograph record composition including polyvinyl chloride thermoplastic resin alone or in combination with a copolymer of vinyl chloride and vinyl acetate, toluene in an amount sufficient to partially solvate the resin and cause the resin to fuse more quickly and completely on heating, a heat stabilizer for the resin and a colorant for the phonograph record composition. A phonograph record is prepared by blending the thermoplastic resin with the toluene to form a dry blend, mixing the heat stabilizer and colorant into the dry blend, extruding the dry blend to form a hot preform and molding the hot preform into a phonograph record.

17 Claims, No Drawings

PHONOGRAPH RECORD COMPOSITION AND PROCESS

BACKGROUND OF THE INVENTION

Phonograph records are usually prepared from thermoplastic resins because of their good wear resistance, good resistance to warpage and ease of processing. The thermoplastic resin is typically polyvinyl chloride either alone or in combination with a copolymer of vinyl chloride and vinyl acetate. In the case of the copolymer, the vinyl acetate acts as a plastizer and improves the molding characteristics of the composition. The conventional phonograph record composition contains a heat stabilizer which chemically combines with the decomposition products of the thermoplastic resin which are generated during processing at elevated temperatures. In general, the heat stabilizer acts to extend the heat life of the thermoplastic resin. A colorant is added to the record composition for aesthetic value and so that the final molded surface can be visually inspected. Other chemical additives such as lubricants to improve the flow of the composition during processing can be added if desired.

The viscosity of the resin composition can vary widely and a suitable viscosity will usually be determined by the manufacturing conditions which are employed. The resin viscosity is important, however, since poor quality record discs are produced when the resin viscosity is too low. Conversely, too high a resin viscosity leads to increased molding times and consequently increased record manufacturing costs.

A necessary requirement in phonograph record processing is a thorough blending of the thermoplastic resin and chemical additives to form a homogeneous mass. Otherwise, boundaries will exist between the resin and the chemical additives which will be picked up by the phonograph needle and result in surface noise and poor sound quality.

A further desirable quality in phonograph record manufacture is the accurate reproduction of the sound grooves. Record sound grooves have widths on the order of 0.001 inch and the record stylus is capable of detecting a defect on the order of 0.0001 inch. Accordingly, very accurate production of sound grooves is an absolute necessity for the production of good fidelity records.

Modern phonograph records typically weigh in the range of 130 to 140 grams. Since phonograph records have standard diameters, the thickness of the record is the most important criteria in determining its weight, assuming that the same thermoplastic resins are employed. Controlling the thickness and thereby the weight of the record is extremely important for economic reasons since substantial material costs can be saved if the record can be made lighter without loss in sound quality.

High surface gloss and other factors relating to visual appeal are also important from an aesthetic viewpoint in the production of phonograph records, and are determined in large part by the effectiveness of the colorant.

An object of the present invention is to provide a phonograph record composition which can be more easily processed than conventional compositions and which results in an improved phonograph record.

A further object of the present invention is to provide a phonograph record composition which has a lower melt viscosity than the corresponding conventional thermoplastic resin composition and which results in shorter molding cycles and a reduction in record manufacturing costs.

A still further object of the present invention is to provide a phonograph record composition in which the thermoplastic resin is homogeneously blended with the heat stabilizer, colorant, and other chemical additives so that the resulting record has a smooth surface and lower surface noise.

Another object of the present invention is to provide a phonograph record composition which can be molded into a record with more precise duplication of the record sound grooves than is typically produced.

Still another object of the present invention is to provide a phonograph record composition which can be molded into a thinner and lighter weight record, thereby resulting in a savings in material costs.

Yet another object of the present invention is to provide a phonograph record composition which results in a record of improved fidelity and which is more visually appealing than conventional records.

Further objects and advantages of the present invention will become apparent upon reading the undergoing specification and claims.

SUMMARY OF THE INVENTION

The present invention relates to an improved phonograph record composition having a thermoplastic resin base material. The thermoplastic resin in polyvinyl chloride or a combination of polyvinyl chloride and a copolymer of vinyl chloride and vinyl acetate. Toluene is added to the thermoplastic resin in an amount sufficient to partially solvate the resin and cause the resin to fuse more quickly and completely on heating. The composition also contains a heat stabilizer for the resin and a colorant for the phonograph record composition.

The phonograph record is processed by blending the thermoplastic resin with the toluene to form a dry blend. The heat stabilizer, colorant and other chemical additives are then mixed into the dry blend. The dry blend is extruded to form a hot preform which is then molded into a phonograph record.

The toluene coats and impregnates the polyvinyl chloride or the combination of polyvinyl chloride and vinyl chloride - vinyl acetate copolymer resin particles. The toluene partially solvates the resin particles to the degree that, when the composition is processed, the toluene additive acts as a processing aid and causes the resins to fuse more quickly and completely. Consequently, the thermoplastic resin and chemical additives become a more completely blended, homogeneous mass. The solvating effect results in a lower melt viscosity for the resin during hot melt processing which improves the flow characteristics of the composition and allows the record press to mold a record with a more precise duplication of the sound grooves. Because the resin particles have been so completely fused by virtue of the effect of the toluene additive, the resulting record is of higher quality, has lower surface noise, improved fidelity and higher surface gloss. In general, the effect of the toluene is to enable the record manufacturer to mold, with greater ease and economy, a thinner, lighter weight, more visually appealing record which has optimum sound reproduction.

DESCRIPTION OF THE PREFERRED EMBODIMENTS

The phonograph record composition of the present invention includes, with the exception of toluene, materials which are conventionally used for the manufacture of phonograph records.

Thermoplastic resins are used as the base material. Specifically, the thermoplastic resin is polyvinyl chloride homopolymer or a combination of polyvinyl chloride homopolymer and a copolymer of vinyl chloride and vinyl acetate. The homopolymer and copolymer can be employed in any combination conventionally employed for phonograph records. Generally speaking, the thermoplastic resin will contain about 100 to 10 percent by weight of polyvinyl chloride and about 0 to 90 percent by weight of the vinly chloride - vinyl acetate copolymer. A more preferred range of polyvinyl chloride homopolymer and vinyl chloride - vinyl acetate copolymer is about 50 to 10 percent by weight homopolymer and about 50 to 90 percent by weight copolymer. The weight relationship between the vinyl chloride and vinyl acetate in the copolymer can be any weight relationship used in conventional record manufacture. Generally speaking, however, the copolymer will contain about 80 to 95 percent by weight vinyl chloride and about 5 to 20 percent by weight vinyl acetate. As previously stated, the vinyl acetate acts as a plasticizer and improves the molding characteristics of the composition.

The resin viscosity can vary depending upon the exact manufacturing conditions employed and any viscosity range can be used which is conventionally employed in making phonograph records. Generally speaking, the polyvinyl chloride homopolymer will have a specific viscosity in the range of 0.19 to 0.28 and the vinyl chloride - vinyl acetate copolymer a specific viscosity in the range of 0.155 to 0.195. In like manner, the resin particle size distribution can be varied to meet specific needs as is well known in the art.

The phonograph record composition contains the chemical additives which are normally used with thermoplastic resins in phonograph record manufacture. A heat stabilizer is used to chemically combine with the decomposition products of the thermoplastic resin which are produced during processing at elevated temperatures. The stabilizer is used to extend the heat life of the plastic mass formed on heating of the thermoplastic resin to elevated temperatures and can be either a liquid or a solid. The stabilizer should be soluble in the vinyl resin in order to eliminate surface noise which would result if boundaries are formed between the vinyl resin and stabilizer which could be picked up by the stylus. The heat stabilizer is typically a lead, tin, barium and/or cadmium organometallic compound. In particular, the vinyl resin stabilizer is a metal salt of a $C_{12}$–$C_{18}$ monocarboxylic aliphatic acid such as lauric or stearic acid. The tin stabilizer is in the form of a mercaptide or maleate. The heat stabilizer normally comprises about 0.5 to 1.25 parts for each 100 parts of vinyl resin used in the composition.

A lubricant is customarily added to the phonograph record composition to promote the flow of the composition during processing. The lubricant can comprise about 0.4 to 1.0 parts for each 100 parts of thermoplastic resin used in the composition. The lubricant is typically a wax and can be a natural wax such as carnauba wax or a synthetic wax such as distearyl amide type waxes.

The colorant is normally carbon black and is used so that the molded surface of the phonograph record can be visually inspected. Generally speaking, the colorant will be employed at a concentration of about 0.25 to 0.50 parts for each 100 parts of vinyl resin. The carbon black should be of small particles size in order to minimize surface noise. A suitable carbon black is "fine chanel" or "furnace grade" carbon black.

The phonograph record composition contains toluene (i.e., methylbenzene) in an amount sufficient to partially solvate the thermoplastic resin and cause the resin to fuse more quickly and completely on heating. The toluene is normally used in the phonograph record composition in an amount of about 2 to 5 parts for each 100 parts of thermoplastic resin. The generally preferred quantity of toluene is about 3 parts for each 100 parts of vinyl resin.

The phonograph record composition of the present invention is prepared for molding by a dry blend process. The vinyl resin powder is first blended with the toluene to form a dry blend. This dry blending operation is accomplished by intensively mixing the vinyl resin powder and toluene in a conventional high speed shear mixer. The process is referred to as "dry blending" in contradistinction to older conventional processes in which the record ingredients are mixed in a steam-heated Banbury mixer to produce a granulated molding material. The conventional chemical additives are added to the dry blend after the vinyl resin and toluene have been thoroughly blended together. More specifically, the heat stabilizer, lubricant and colorant are mixed into the dry blend in a high speed shear mixer. The dry blend can be used in the powder form or pelletized or granulated if desired. The term "dry blend" as used herein includes the mixture of vinyl resin, heat stabilizer, colorant and toluene whether in powder, pellet or granular form.

The dry blend is then extruded to form what is conventionally referred to as a "hot preform," which is basically a gummy mass ready for molding. The word "extrusion" is used herein to include conventional screw or plunger-type preheaters which are modified with a special screen pack to create high shear forces which disperse the ingredients thoroughly. In the extrusion operation, the phonograph record composition becomes fully plasticated and forms a thermally homogeneous melt which is forced through the extruder at a uniform flow rate. Because the vinyl resin is thermoplastic, no cross-linking takes place on heating to change the molding properties or performance of the vinyl material in the final molded phonograph record. When the hot preform leaves the extruder it is typically at a temperature of about 135° to 155°C. The hot preform is then molded into a phonograph record in accordance with conventional techniques. This molding operation is typically conducted at a molding press temperature of about 120° – 150° C and at pressures up to 2,200 pounds per square inch.

The toluene additive has several beneficial effects upon the processing of the record composition and upon the quality of the resulting phonograph record. The toluene partially solvates the resin particles to the degree that, when the composition is processed, the toluene additive acts as a processing aid causing the resins to fuse more quickly and completely. The toluene also causes the entire composition, namely, the vinyl resins, heat stabilizer, lubricant and colorant, to become a more completely blended homogeneous mass during processing. Accordingly, the resulting phonograph record has a smooth surface and lower surface noise than conventional records. The lower surface noise results from the fact that there are no boundaries formed between the vinyl resin material and the chemical additives which would be picked up by the stylus.

The record composition has a lower melt viscosity than the corresponding conventional thermoplastic resin composition during hot melt processing. This improves the flow characteristics of the composition and results in shorter molding cycles and a reduction in record manufacturing costs. These improved flow characteristics also result in a more precise duplication of the record sound grooves on molding since the record composition more easily and completely fills the grooves in the molding press. It has also been found that the record produced is thinner and therefore lighter in weight because of the better flow characteristics of the phonograph record composition.

In addition to the above, it has also been found that the resulting phonograph record has a higher surface gloss and improved fidelity.

In summary, therefore, the effect of the toluene additive is to enable the record manufacturer to mold, with greater ease and economy, a thinner, lighter weight, more visually appealing record with optimum sound reproduction.

As illustrative of the present invention, a phonograph record composition was prepared in which the thermoplastic resin contained 35 percent by weight polyvinyl chloride and 65 percent by weight of a copolymer of vinyl chloride and vinyl acetate containing 86 percent by weight vinyl chloride and 14 percent by weight vinyl acetate. Three chemical additives were used in the record composition. The first additive was a barium stearate heat stabilizer in an amount of 0.70 parts for each 100 parts of vinyl resin. The particular stabilizer employed was the commercially available product Synpron-160 sold by Synthetic Products, Inc. The lubricant employed was a distearyl amide type wax in the amount of 0.40 parts for each 100 parts of vinyl resin. This synthetic wax was the commercially available product Acrawax C sold by Glyco Chemical Co. For the colorant, carbon black in an amount of 0.25 parts for each 100 parts of vinyl resin was used. The carbon black was the commercially available product Superba Black sold by Columbian Carbon Co.

Two phonograph record compositions were prepared which wer identical with the exception that the first composition contained 3.0 parts of toluene for each 100 parts of vinyl resin. The record composition containing toluene was processed as followes — the vinyl resin and toluene were blended in a high speed shear mixer (Henschel blender) for 2 minutes or until the vinyl resin was thoroughly blended with the toluene. The heat stabilizer, lubricant and colorant were added to the vinyl resin-toluene homogeneous blend and these materials were thoroughly mixed in the same high speed shear mixer for a further 1½ minutes. The second phonograph record composition which did not contain toluene was prepared in the same manner except that only one 2¾-minute blending operation was required in which the heat stabilizer, lubricant and colorant were added to the vinyl resin. Each of the compositions was then extruded through an extruder conventionally used in the dry blend processing of phonograph record compositions. After being extruded, the hot preform formed in the extrusion operation was placed in a press and molded into a phonograph record in accordance with conventional technique.

The phonograph record produced from the second (conventional) phonograph record composition weighed 132 grams whereas the record produced from the first composition weighed 112 grams. Upon visual inspection, it was noted that the first record was blacker, had a higher surface gloss and was generally more visually appealing than the second record. It was also found that the first record had more precise sound groove reproduction than the second record. Each of the records was played on a phonograph and it was found that the first record had less surface noise, better fidelity, and in general a more pleasing sound than the second record.

Although one specific embodiment of the present invention has been described above, it should be understood that this embodiment is described for illustrative purposes only and that numerous alterations and modifications can be practiced by those skilled in the art without departing from the scope of the invention. Accordingly, it is the intent that the present invention not be limited by the above, but be limited only as defined in the appended claims.

I claim:

1. A phonograph record composition comprising a thermoplastic resin selected from the group consisting of polyvinyl chloride and a combination of polyvinyl chloride and a copolymer of vinyl chloride and vinyl acetate, toluene in an amount of about 2 to 5 parts for each 100 parts of thermoplastic resin, a heat stabilizer for the thermoplastic resin and a colorant for the phonograph record composition.

2. The phonograph record composition of claim 1 in which the thermoplastic resin is a combination of polyvinyl chloride and up to about 90 percent by weight of a copolymer of vinyl chloride and vinyl acetate.

3. The phonograph record composition of claim 1 in which the copolymer contains about 85 to 95 percent by weight of vinyl chloride and about 5 to 15 percent by weight of vinyl acetate.

4. The phonograph record composition of claim 1 in which the heat stabilizer is a metal salt of a $C_{12}$–$C_{18}$ monocarboxylic aliphatic acid.

5. The phonograph record composition of claim 1 in which the colorant is carbon black.

6. The phonograph record composition of claim 1 including a lubricant to improve the flow properties of the composition during processing.

7. The phonograph record composition of claim 6 in which the lubricant is a synthetic wax.

8. A phonograph record composition comprising a thermoplastic resin containing about 100 to 10 percent by weight polyvinyl chloride and about 0 to 90 percent by weight of a copolymer of vinyl chloride and vinyl acetate, toluene in an amount of about 2 to 5 parts for each 100 parts of thermoplastic resin, a heat stabilizer for the thermoplastic resin selected from the group consisting of metal salts of $C_{12}$ – $C_{18}$ monocarboxylic aliphatic acids and a carbon black colorant.

9. The phonograph record composition of claim 8 in which the heat stabilizer is present in an amount of about 0.5 to 1.25 parts for each 100 parts of thermoplastic resin.

10. The phonograph record composition of claim 8 in which the colorant is present in an amount of about 0.25 to 0.50 parts for each 100 parts of thermoplastic resin.

11. The phonograph record composition of claim 8 including a wax lubricant in an amount of about 0.4 to 1.0 parts for each 100 parts of thermoplastic resin.

12. The phonograph record composition of claim 11 in which the wax lubricant is a distearyl amide synthetic wax.

13. A process for preparing a phonograph record comprising dry blending a thermoplastic resin selected from the group consisting of polyvinyl chloride and a combination of polyvinyl chloride and a copolymer of vinyl chloride and vinyl acetate with toluene in an amount of about 2 to 5 parts for each 100 parts of thermoplastic resin to form a dry blend, mixing a heat stabilizer for the thermoplastic resin and a colorant for the phonograph record into the dry blend, extruding the dry blend to form a hot preform and molding the hot preform into a phonograph record.

14. The process of claim 13 in which the thermoplastic resin is a combination of polyvinyl chloride and up to about 90 percent by weight of a copolymer of vinyl chloride and vinyl acetate.

15. The process of claim 13 in which the heat stabilizer is a metal salt of a $C_{12} - C_{18}$ monocarboxylic aliphatic acid.

16. The process of claim 13 in which a lubricant is blended into the dry blend to improve the flow properties of the dry blend during the extrusion and molding operations.

17. The process of claim 12 in which the lubricant is a synthetic wax.

* * * * *